United States Patent [19]

Slavens et al.

[11] 4,250,813
[45] Feb. 17, 1981

[54] TRACK APPARATUS

[75] Inventors: Clyde M. Slavens; Edward A. Clavin, both of Houston, Tex.

[73] Assignee: Midcon Pipeline Equipment Co., Houston, Tex.

[21] Appl. No.: 910,353

[22] Filed: May 30, 1978

[51] Int. Cl.³ .................................................. E01B 25/08
[52] U.S. Cl. ........................................ 104/118; 74/52; 228/29
[58] Field of Search ............... 104/118, 106, 107, 110; 228/29, 25, 32; 74/520

[56] References Cited

U.S. PATENT DOCUMENTS

| 2,574,281 | 11/1951 | Olson | 74/520 |
| 2,608,192 | 8/1952 | Heitmeyer et al. | 74/520 |
| 3,604,612 | 9/1971 | Miller et al. | 228/29 |
| 3,910,480 | 10/1975 | Thatcher | 228/29 |
| 4,092,928 | 6/1978 | Clavin | 104/119 |
| 4,132,338 | 1/1979 | Bove et al. | 228/29 |

FOREIGN PATENT DOCUMENTS

| 2407930 | 9/1974 | Fed. Rep. of Germany | 228/29 |
| 2166743 | 12/1975 | Fed. Rep. of Germany | 228/29 |
| 2033741 | 12/1970 | France | 228/29 |
| 50-38379 | 12/1975 | Japan | 228/29 |

Primary Examiner—John J. Love
Assistant Examiner—Ross Weaver
Attorney, Agent, or Firm—Carl B. Fox, Jr.

[57] ABSTRACT

Track apparatus, consisting of a circular track adapted to be affixed end-to-end around a pipe, usually adjacent an end thereof, to support a carriage apparatus for travel about the pipe, welding equipment, or the like, being mounted on the carriage apparatus for use in welding the pipe to another pipe abutted end-to-end therewith, or for other similar purposes. The track is supported by circularly spaced crossbars each provided with inwardly projecting spring biased pins upon which the crossbars are supported. A latch device for affixing the ends of the track together is provided. The track has frictional engagement means around its outwardly facing surface for engagement by drive wheels of the carriage apparatus.

19 Claims, 7 Drawing Figures

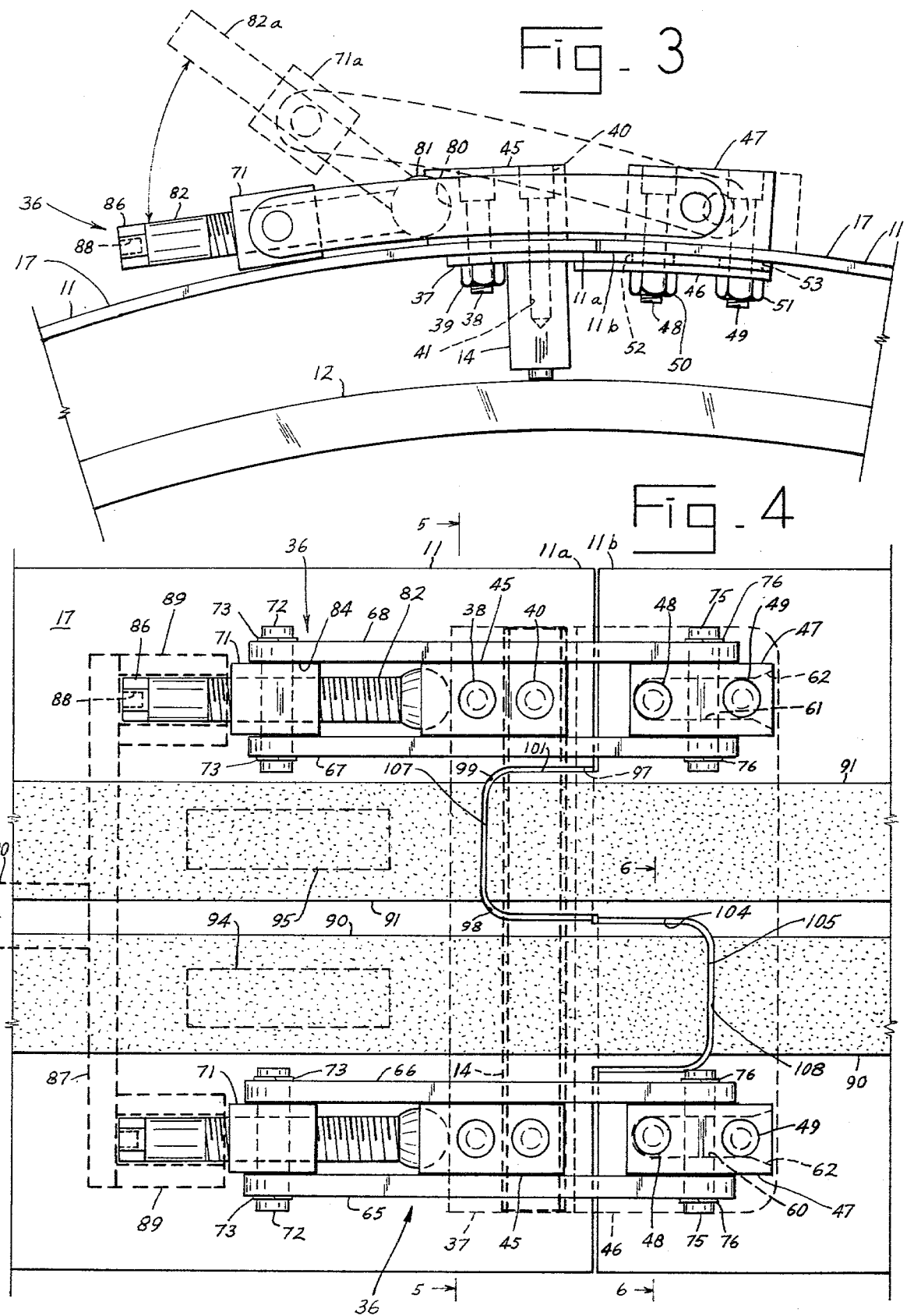

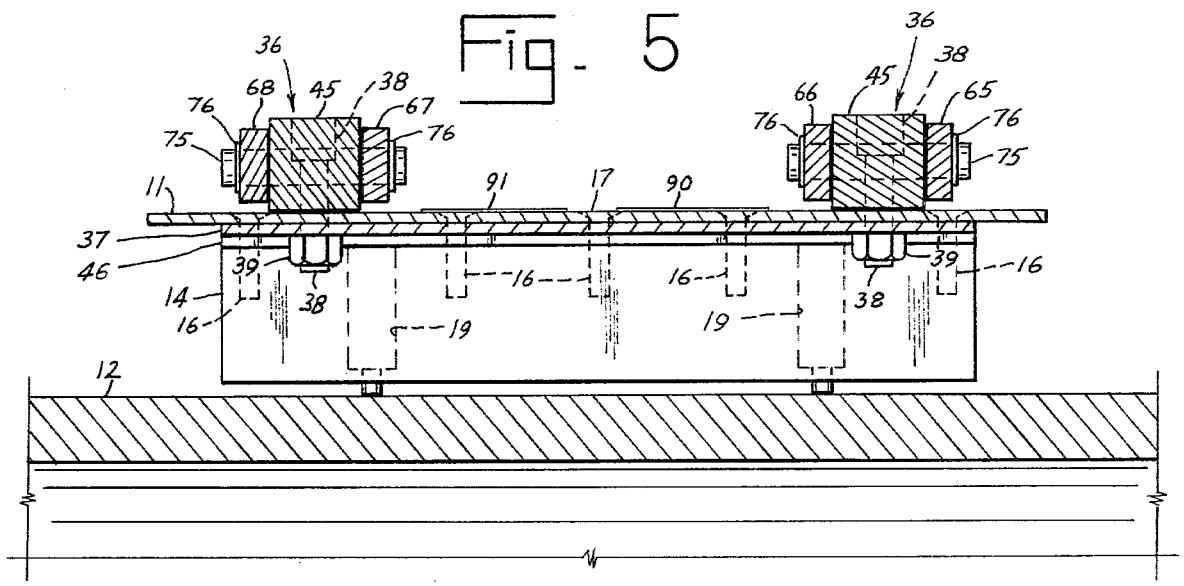
Fig. 5
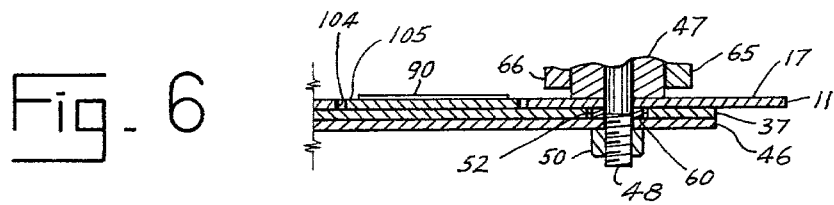
Fig. 6
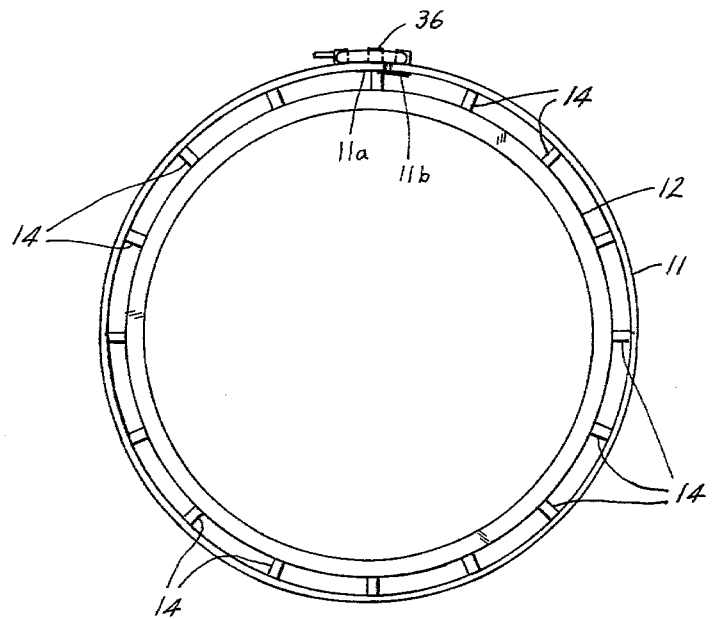
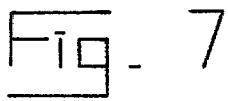
Fig. 7

TRACK APPARATUS

BACKGROUND OF THE INVENTION

Tracks provided in the art for supporting welding apparatus carriages for travel about a pipe for use in welding pipes together end-to-end have been far from completely satisfactory. Most of such tracks provided by the art have been supported by spaced rows of circularly spaced pins, the inner ends of which engage the pipe, and these pins are not engaged with the pipe and tend to slide upon the outer pipe surface, so that proper alignment of the track with regard to the pipe end is difficult to achieve. Furthermore, the pins do not fully support the track across its width, sometimes resulting in lateral buckling of the track. The invention seeks to provide a solution to these problems, and others, in the form of an improved track apparatus.

SUMMARY OF THE INVENTION

The invention provides improved track apparatus of the type disclosed circularly about a pipe, usually adjacent its end, to carry welding apparatus for travel about the pipe for use in welding the pipe to an abutted second pipe, or for other similar purpose. The novel track is supported by circularly spaced crossbars each of which is provided with pins which are spring biased toward the track. During installation of the track, the pins bear against the track so that the track is supported before it is tightened to its final disposition about the pipe. When the track is tightened by the latch apparatus which connects the ends of the track together, the spring biased pins provide a certain amount of resilience to compensate for heat expansion or contraction of the pipe, and to facilitate bring of the track ends together for connection. The track end latch apparatus provided by the invention provides overlapping drive surfaces whereby the drive wheels of the carriage apparatus do not encounter gaps, whereby sustained driving of the carriage is obtained completely around the pipe circumference. The latch apparatus is length adjustable to accommodate to variances in pipe circumferences.

A principle object of the invention is to provide improved track apparatus for disposition about a pipe, or other outwardly curved object. Another object of the invention is to provide such track apparatus having spring-biased means at its inward side to provide a certain amount of variation as to track length about the pipe or other outwardly curved object during installation of the track. A further object of the invention is to provide such apparatus having improved end connection means. Another object of the invention is to provide such apparatus which provides uninterrupted frictional drive surfaces for engagement by the drive wheels of a welding carriage. Yet another object of the invention is to provide such apparatus which is simple, dependable, and economical.

Other objects and advantages of the invention will appear from the following detailed description of a preferred embodiment, reference being made to the accompanying drawings.

BRIEF DESCRIPTIONS OF THE DRAWINGS

FIG. 3 is a side elevation of the preferred form of track end latching apparatus according to the invention.

FIG. 4 is a plan view of the apparatus shown in FIG. 3.

FIG. 5 is a transverse cross section taken at line 5—5 of FIG. 4.

FIG. 6 is a partial transverse cross section taken at line 6—6 of FIG. 4.

FIG. 7 is a reduced, partially schematic, side elevation of the apparatus shown in the other drawings.

DESCRIPTION OF THE PREFERRED EMBODIMENT

Figure 1:
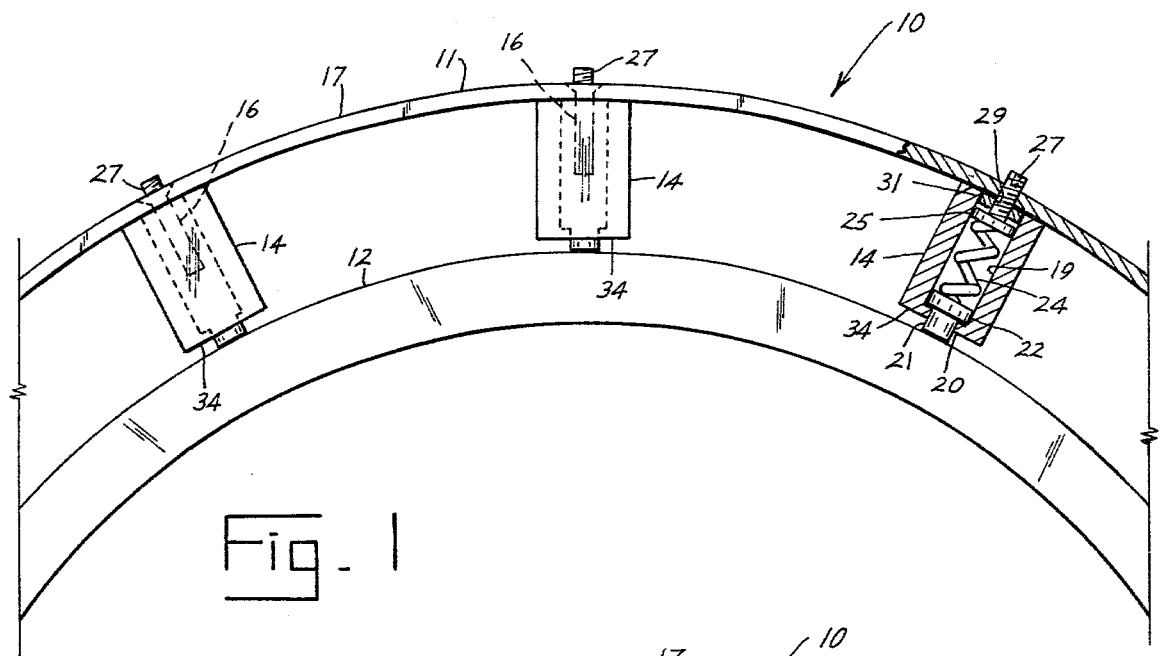
FIG. 1 is a partial side elevation of a preferred embodiment of track apparatus according to the invention, showing a portion of the apparatus in vertical cross section.
Figure 2:
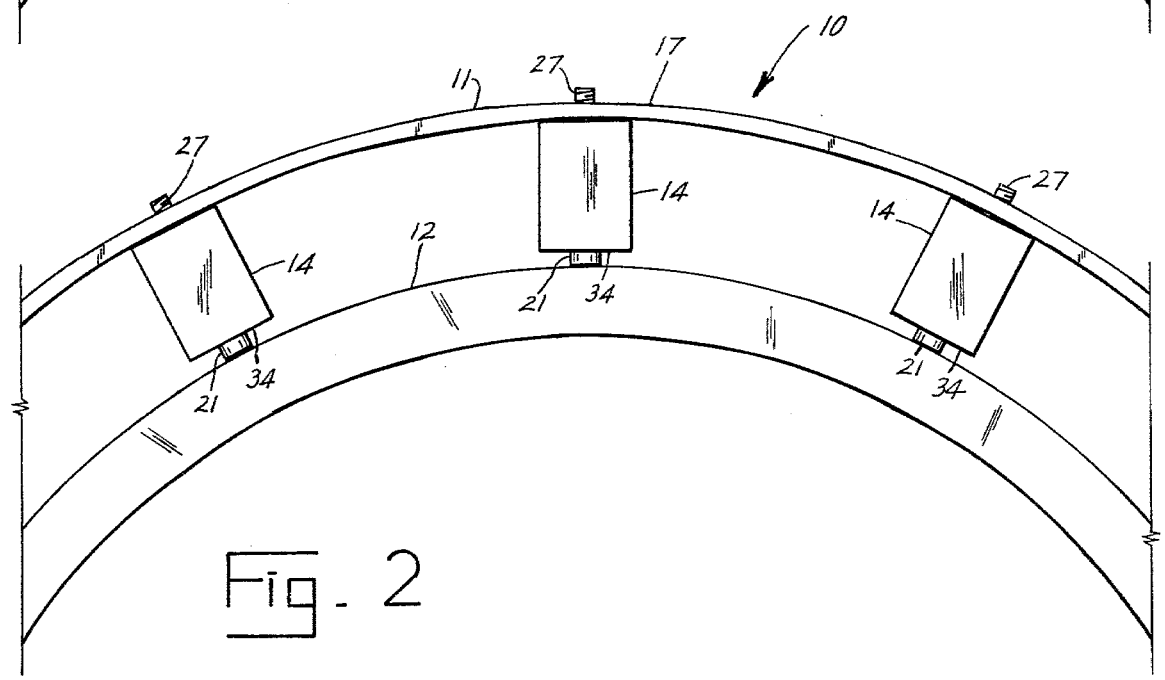
FIG. 2 is similar to FIG. 1, showing the track in elevation.

Referring now to the drawings in detail, the track apparatus includes a track 11 in the form of a band or strip of metal or other suitable material of uniform transverse width, the track being circularly curved to be disposed about the outer periphery of a pipe 12.

Track 11 is supported by a plurality of transverse bars or blocks 14 which are affixed to the track 11 by plural transversely spaced screws 16, the heads of which are flush or recessed with respect to the outer track surface 17. Each bar 14 has radially therethrough a pair of spaced bores 19 having flanges or shoulders 20 around their inner ends. A pin 21 has surrounding shoulder 22 which is retained by flange 20. A compression spring 24 is engaged at its outer end by disc 25 which is adjustably retained by a screw 27 bearing thereagainst, screw 27 being screwed into a tapped opening 29 through a retainer ring 31 which is screwed (threads not shown) into the outer end of the bore 19. When screw 27 is screwed inwardly, spring 24 is compressed so that it bears with greater force against pin 21. When screw 27 is screwed outwardly, the spring compression is reduced. In this manner, the force with which pin 21 bears against the outer surface 17 of pipe 12 may be adjusted. The spring compression is preferably adjusted such that a force of about forty pounds is required to compress the spring and to depress the pin 21. Springs of suitable compressive resistance may be provided, without provision for adjustment of the spring compression, which alteration may easily be made by those skilled in the art. The spring-biased supports permit a certain degree of variation of track length about the pipe, and compensate for heat expansion and contraction of the pipe circumference. The track is fully supported transversely over the transverse length of each bar 14, so that the track is not subject to transverse buckling or unlevelness.

Referring now particularly to FIGS. 3–6, there is shown apparatus for securing the opposite ends 11a, 11b of the track together. The apparatus includes two paralely disposed latch devices 36. A plate 37 of the same curvature as the track is secured to track end 11a by bolt 38 which is secured by nut 39 and by bolts 40 which are screwed into tapped openings 41 in one of the bars 14. Plate 37 extends nearly the full width of the track, as shown in FIG. 4, and extends along the length of the track from a point spaced from the end of track end 11a to underlap the end 11b of the track as shown in FIG. 3. The bolt 38 and screw 40 are passed through holes through a block 45 so that the block 45 is fixed to the outer surface of track end 11a spaced from its end.

A plate 46 of the same curvature as track 11 is affixed to the underside of track end 11b by bolts 48, 49 secured by nuts 50, 51, respectively. Bolts 48, 49 are passed through holes through a block 47 so that the block 47 is fixed to the outer surface of track end 11b, spaced from its end. Washers 52, 53 disposed between track end 11b and plate 46 to serve as spacers so that plate 37 may be received between track end 11b and plate 46. Plate 37 has slots 60, 61 flared at their outer ends 62 within which washers 52, 53 are disposed when the end of plate 37 is received to between track end 11b and plate 46. The flared ends 62 of the slots 60, 61 serve to guide the washers 52, 53 into the slots.

At each side of the track, a pair of links or toggles 65, 66 and 67, 68, having the same end to end curvature as the track, are affixed at one end to a block 71 by a crosspin 72 secured to its opposite ends by split rings 73. At their other ends, the links 65-68 are affixed, in pairs, at opposite sides of the blocks 47 by crosspins 75 secured at their opposite ends by split rings 76. The connections at pins 72, 75 are pivotal connections, so that block 71 may be moved between a position against track 11 and an elevated position such as position 71a, shown in FIG. 3.

Each block 45 has, at its lefthand end as shown in FIGS. 3 and 4, a spherically dished recess 80. A ball or sphere 81 is carried at the end of a shaft 82 which is outwardly threaded over a portion of its length and screwed through a tapped opening 84 through block 71. The terminal position 86 of each shaft 82 is in the form of a hexagon whereby it may be engaged by a wrench if desired. A cylindrical bore 88 is provided in the outer end of each shaft 82, which may be engaged by a tool. The part of each shaft 82 extending to the right of the block 71 may be adjusted in length by rotation of the shaft 82. The ball 81 is not fixed in the recess or socket 82. When the shaft 82 is raised from its solid line position, FIG. 3, to an elevated position such as position 82a, the ball 81 may be removed from the socket 80.

In FIG. 4 there is shown, by dashed lines, a tool 87 having a crossbar 88 to the opposite ends of which are affixed tubular sockets 89 adapted to removably receive the ends of shafts 82 therein. A handle 90 is carried at the center of crossbar 88. By use of tool 87, the two shafts 82 may be simultaneously moved between their positions with blocks 71 against the track and their elevated positions 82a, shown in FIG. 3. The tool is removed from shafts 82 when not in use.

The track ends 11a, 11b are drawn together to tighten the track about pipe 12 by drawing together the blocks 45, 47. This is accomplished by rotating the shafts 82 to provide extensions of the shafts to the right of the blocks 71 sufficiently that when the shafts 82 are moved from their dashed line positions 82a to their solid line positions 82, FIG. 3, the blocks 45 are moved toward blocks 47 by a sufficient distance that the track ends 11a, 11b are brought together to close proximity. The adjustments of screws or shafts 82 is easily made. Of course, should the track apparatus be moved to another section of pipe, possibly having a different outer diameter, then the shafts 82 must again be adjusted so that the track will properly fit about the pipe.

The force exerted to draw blocks 45 toward blocks 47 is a resilient force because of the resilient pins 21. The springs 24 serve to provide this resiliency with respect to the tightening of the track about the pipe.

The track 11 is provided with a pair of strips of friction material, 90, 91. These, in preferred form, consist of adhesive-backed emery cloth, which may be obtained commercially. The emery cloth is provided commercially in a form having adhesive at its back side covered by a peelable strip of paper or plastic. The strip is removed, exposing the adhesive, and the strips of emery cloth may then be disposed about the track and adhered in place. In this manner, a frictional track surface is readily obtained, which may be easily repaired or replaced and which is very serviceable and provides a superior frictional surface for engagement by the plastic or rubber wheels of a welding carriage apparatus. The welding carriage to which the track shown in the drawings is adapted will have a pair of driving wheels 94, 95, the relative positions of which are indicated by dashed lines in FIG. 4, which engage the friction strips 90, 91. Strips of friction material other than emery cloth may be used, such as strips of sandpaper or grannule-surfaced roofing material, but these are not as satisfactory as, and do not have the long wearing qualities of, emery cloth. If the welding carriage has its driving wheels in different transverse positions, or if only one driving wheel is provided, the apparatus may be rearranged so that the friction strip or strips will be at the location of the driving wheel or wheels.

In order that there will be no interruptions in the propulsion of the welding carriage along the track, the track ends are in the forms shown in FIG. 4. Track end 11a has a recess 97 of generally rectangular shape, having rounded corners at its inner end, at 98, 99, and track end 11b has tab 101 of corresponding shape extending therefrom. The tab 101 is received into recess 97 when the track ends are brought together. Identically, track end 11b has a recess 104 and track end 11a has a tab 105, tab 105 being received in recess 104 when the track ends are brought together. In this manner, the gaps 107, 108 between the track ends are staggered along the length of the rack so that regardless of the sizes of the gaps 107, 108, one of the driving wheels 94, 95 will be firmly engaged with one of the frictional strips 90, 91 in the rolling past the gaps.

The track apparatus which has been described provides a strong and uniform support for welding carriage traveling therearound. The crossbars 14 provide lateral support for the track so that even though the welding carriage imposes inward forces against the track from opposite sides, the track will not be subject to transverse collapse. The track is adequately supported along the lines of the frictional strips 90, 91 by the blocks 14, this support not being provided by pin supported tracks heretofore known. The depressible pins 21 provide that the apparatus may be easily connected about a pipe. The pins 21 extending from the bars 14 when the track is initially placed about the pipe provide a deterrent to movement of the track while it is being established in its final position about the pipe. Then, when the track ends are latched together by the apparatus shown in FIGS. 3 and 4, the resilient pins 21 permit a certain amount of variation in the length of the track. The latch mechanism is enabled to operate under longitudinal track tension, simplifying its operation, the track never being completely loose about the pipe during installation.

The frictional strips 90, 91 improve driving performance of the carriage, since the emery surfaces thereof provide uniform friction with the driving wheels of the welding carriage so that slippage between the wheels and tracks does not occur.

The track apparatus herein disclosed may be installed around objects other than pipes. For example, the track may be installed around outwardly curved tanks, and used in welding seams around the tanks. The apparatus may be installed around stacks and other process equipment, whether circular or oval in shape. Other uses for the invention may be perceived by those skilled in the art.

While a preferred embodiment of the invention has been described and shown in the drawings, many modifications thereof may be made by a person skilled in the art without departing from the spirit of the invention, and it is intended to protect by Letters Patent all forms of the invention falling within the scope of the following claims.

We claim:

1. Track apparatus, comprising a track strip of uniform width curved for connection end-to-end and adapted to be disposed about an outwardly curved object, connection means for releasably connecting the opposite ends of said track strip together, and plural spaced bar means affixed across the inner side of said track strip for supporting said track strip spaced from the outer surface of the object, each said bar means having inwardly biased pin means for engaging said object when said track strip is connected about said object, and including means for adjusting the inward bias of each said pin means.

2. The combination of claim 1, said bar means being of uniform thickness whereby said track strip is uniformly spaced from the object over its length.

3. The combination of claim 2, said bar means terminating at points uniformly spaced from the opposite edges of said track strip.

4. Track apparatus, comprising a track strip of uniform width curved for connection end-to-end and adapted to be disposed about an outwardly curved object, connection means for releasably connecting the opposite ends of said track strip together, and plural spaced bar means affixed across the inner side of said track strip for supporting said track strip spaced from the outer surface of the object, said bar means being of uniform thickness whereby said track strip is uniformly spaced from the object over its length, each said bar means having inwardly biased pin means for engaging said object when said track strip is connected about the object, each said pin means being biased inwardly by compression spring means, and including means for adjusting the compression of each said compression spring means to alter the inward bias of each said pin means.

5. The combination of claim 1, including friction means adhered around the outer surface of said track strip for engagement by drive wheel means of a vehicle adapted to travel around said track strip.

6. The combination of claim 5, said friction means comprising emery-faced material in strip form adhered to the outer surface of said track strip around the length thereof.

7. The combination of claim 6, said emery-faced material being adhered to said track strip by an adhesive.

8. The combination of claim 7, said emery-faced material comprising emery cloth having a layer of adhesive at its underside supplied with a peelable covering strip covering said adhesive and being applied to said track strip after peeling of said peelable covering strip therefrom.

9. The combination of claim 2, said track strip having a pair of parallel wheel engagement paths therearound; said track strip, at each end thereof, being elongated at one of said paths whereby the connected ends of said paths are offset along the length of said track strip whereby a pair of side by side drive wheels of a vehicle traveling along said track strip do not engage the connected ends of both of said paths simultaneously whereby interruptions in the driving of said vehicle caused by gaps between said connected path ends do not occur.

10. The combination of claim 9, said connection means for releasably connecting the opposite ends of said track strip together comprising first support means connected to one end of said track strip and second support means connected to the other end of said track strip in line with said first support means and spaced therefrom, pivotal link means pivotally connected at one end thereof to said first support means and extending past said second support means at the other end thereof, shaft means supported by body means pivotally carried at said other end of said link means and being pivotally engageable with said second support means at one of its ends, said shaft means being movable between a position adjacent said track strip generally aligned with said first and second support means and positions angularly outward from said track strip out of alignment with said first and second support means, said shaft means when moved from a said position angularly away from said track strip to said position adjacent said track strip urging said second support means toward said first support means to move said ends of said track strip together to tighten said track strip about the object.

11. The combination of claim 10, said shaft means being threaded and being engaged through a tapped opening through said body means whereby the length thereof between said body means and said second support means may be adjusted to adjust the distance by which said track ends are moved together by movement of said shaft means from said position away from said track strip to said position adjacent said track strip.

12. The combination of claim 11, said second support means having first engagement means facing said shaft means and said one end of said shaft means having second engagement means adapted to removably pivotally engage with said first engagement means.

13. The combination of claim 12, said first engagement means comprising a spherically curved socket and said second engagement means comprising a spherically curved projection adapted to flushly seat in said socket.

14. The combination of claim 11, said first support means comprising first block means affixed to said one end of said track strip, said second support means comprising second block means affixed to said other end of said track strip, said link means comprising a pair of toggle links disposed at opposite sides of said first and second block means and at opposite sides of said body means.

15. The combination of claim 14, including first plate means affixed parallely spaced from the inner end of said one end of said track strip and extending beyond said one end, second plate means affixed parallely against the inner end of said other end of said track strip and extending beyond said other end and being adapted to be received between said one end of said track strip and said first plate means when said ends of said track strip are connected.

16. The combination of claim 15, including means for guiding said second plate means on its movement to between said one end of said track strip and said first plate means.

17. The combination of claim 10, including two of said connection means parallely spacedly disposed at said ends of said track strip.

18. The combination of claim 17, including tool means for simultaneously moving said shaft means of said two connection means between said positions angularly outward from and adjacent said track strip.

19. The combination of claim 18, said tool means being removable.

* * * * *